United States Patent
Saito et al.

(10) Patent No.: US 11,132,812 B2
(45) Date of Patent: Sep. 28, 2021

(54) OUTPUT CONTROL DEVICE, INFORMATION OUTPUT SYSTEM, OUTPUT CONTROL METHOD, AND PROGRAM

(71) Applicant: NEC CORPORATION, Tokyo (JP)

(72) Inventors: Shigetsu Saito, Tokyo (JP); Jun Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 148 days.

(21) Appl. No.: 16/077,636

(22) PCT Filed: Mar. 16, 2017

(86) PCT No.: PCT/JP2017/010666
§ 371 (c)(1),
(2) Date: Aug. 13, 2018

(87) PCT Pub. No.: WO2017/164061
PCT Pub. Date: Sep. 28, 2017

(65) Prior Publication Data
US 2019/0035105 A1  Jan. 31, 2019

(30) Foreign Application Priority Data

Mar. 23, 2016 (JP) .............................. JP2016-059185

(51) Int. Cl.
*G06K 9/00* (2006.01)
*G06T 7/70* (2017.01)
(Continued)

(52) U.S. Cl.
CPC ................ *G06T 7/70* (2017.01); *G06F 3/147* (2013.01); *G06K 9/00288* (2013.01);
(Continued)

(58) Field of Classification Search
None
See application file for complete search history.

(56) References Cited

U.S. PATENT DOCUMENTS 8,379,902 B2 * 2/2013 Koseki ................... H04R 1/323
381/387
9,825,969 B2 * 11/2017 Murrells ............... H04L 63/107
(Continued)

FOREIGN PATENT DOCUMENTS

JP      200630819 A    2/2006
JP      2007-193292 A  8/2007
(Continued)

OTHER PUBLICATIONS

International Search Report for PCT/JP2017/010666 dated Jun. 6, 2017 [PCT/ISA/210].
(Continued)

*Primary Examiner* — Soo Jin Park
(74) *Attorney, Agent, or Firm* — Sughrue Mion, PLLC

(57) ABSTRACT

An output control device includes a determination unit configured to determine whether or not a person is a specific person, a processing unit configured to acquire position information of the person, and an output control unit configured to cause a first output device located in the vicinity of the person to output information according to the person on the basis of personal information about the person determined to be the specific person by the determination unit and the position information acquired by the processing unit, wherein the output control unit is configured to cause a second output device to output the information output by the first output device in continuation with the output of the first output device if the person has moved from the vicinity of the first output device to the vicinity of the second output device.

9 Claims, 5 Drawing Sheets

(51) Int. Cl.
  *G06Q 30/02* (2012.01)
  *G06F 3/147* (2006.01)
  *G06T 7/292* (2017.01)
  *G06T 7/20* (2017.01)
(52) U.S. Cl.
  CPC ......... *G06K 9/00295* (2013.01); *G06Q 30/02* (2013.01); *G06Q 30/0271* (2013.01); *G06Q 30/0281* (2013.01); *G06T 7/20* (2013.01); *G06T 7/292* (2017.01); *G06T 2207/10016* (2013.01); *G06T 2207/30196* (2013.01); *G09G 2320/0261* (2013.01); *G09G 2380/04* (2013.01); *G09G 2380/06* (2013.01)

(56) References Cited

U.S. PATENT DOCUMENTS

| | | | | |
|---|---|---|---|---|
| 2008/0059297 A1* | 3/2008 | Vallier | ............... | G06Q 30/02 705/14.27 |
| 2011/0196745 A1* | 8/2011 | Moriya | ............... | G06Q 30/02 705/14.67 |
| 2013/0117248 A1* | 5/2013 | Bhogal | ............ | H04N 21/41407 707/705 |
| 2013/0293581 A1* | 11/2013 | Wissner-Gross | ..... | G06T 19/006 345/633 |
| 2014/0006152 A1* | 1/2014 | Wissner-Gross | ............................ | G06Q 30/0269 705/14.53 |
| 2016/0267552 A1* | 9/2016 | Chandra | ............ | G06Q 30/0276 |

FOREIGN PATENT DOCUMENTS

| | | |
|---|---|---|
| JP | 2010-113314 A | 5/2010 |
| JP | 2012-252613 A | 12/2012 |
| KR | 1020150108178 A | 9/2015 |

OTHER PUBLICATIONS

Communication dated Sep. 24, 2019 from the Japanese Patent Office in application No. 2018-507276.

* cited by examiner

OUTPUT CONTROL DEVICE, INFORMATION OUTPUT SYSTEM, OUTPUT CONTROL METHOD, AND PROGRAM

CROSS REFERENCE TO RELATED APPLICATIONS

This application is a National Stage of International Application No. PCT/JP2017/010666, filed on Mar. 16, 2017, which claims priority from Japanese Patent Application No. 2016-059185, filed on Mar. 23, 2016, the contents of all of which are incorporated herein by reference in their entirety.

TECHNICAL FIELD

The present invention relates to an output control device, an information output system, an output control method, and a program.

BACKGROUND ART

Digital signage devices capable of electrically changing display details in a signage device installed in a space such as the inside of a facility are known. In the digital signage devices, technology for changing display details according to a viewer is known (see, for example, Patent Document 1). Patent Document 1 discloses technology for selecting content having no previous display record for a target person identified in face authentication and displaying the selected content on a digital signage device.

Also, besides the digital signage devices, output devices configured to output information to a person located at a predetermined location such as a parametric speaker are known.

CITATION LIST

Patent Literature

[Patent Document 1]
Japanese Unexamined Patent Application, First Publication No. 2012-252613

SUMMARY OF INVENTION

Technical Problem

However, according to the technology described in Patent Document 1, if content is information that changes over time such as a moving image, the content is excluded from a display target even if the content has not been completely viewed by a target person when the target person has moved away from a digital signage device during reproduction of the content.

An objective of the present invention is to provide an output control device, an information output system, an output control method, and a program for solving the above-described problems.

Solution to Problem

According to a first aspect of the present invention, there is provided an output control device, including: a determination unit configured to determine whether or not a person is a specific person; a processing unit configured to acquire position information of the person; and an output control unit configured to cause a first output device located in the vicinity of the person to output information according to the person on the basis of personal information about the person determined to be the specific person by the determination unit and the position information acquired by the processing unit, wherein the output control unit is configured to cause a second output device to output the information output by the first output device in continuation with the output of the first output device if the person has moved from the vicinity of the first output device to the vicinity of the second output device.

According to a second aspect of the present invention, there is provided an information output system, including: a plurality of output devices; and an output control device configured to control information to be output to the plurality of output devices, wherein the output control device includes a determination unit configured to determine whether or not a person is a specific person; a processing unit configured to acquire position information of the person; and an output control unit configured to cause a first output device located in the vicinity of the person to output information according to the person on the basis of personal information about the person determined to be the specific person by the determination unit and the position information acquired by the processing unit, and wherein the output control unit is configured to cause a second output device to output the information output by the first output device in continuation with the output of the first output device if the person has moved from the vicinity of the first output device to the vicinity of the second output device.

According to a third aspect of the present invention, there is provided an output control method, including: determining whether or not a person is a specific person; acquiring position information of the person; causing a first output device located in the vicinity of the person to output information according to the person on the basis of personal information about the person determined to be the specific person and the acquired position information; and causing a second output device to output the information output by the first output device in continuation with the output of the first output device if the person has moved from the vicinity of the first output device to the vicinity of the second output device.

According to a fourth aspect of the present invention, there is provided a program for causing a computer to execute: determining whether or not a person is a specific person; acquiring position information of the person; causing a first output device located in the vicinity of the person to output information according to the person on the basis of personal information about the person determined to be the specific person and the acquired position information; and causing a second output device to output the information output by the first output device in continuation with the output of the first output device if the person has moved from the vicinity of the first output device to the vicinity of the second output device.

Advantageous Effects of Invention

According to the present invention, it is possible to cause a second output device, which is another output device located in the vicinity of a person, to continuously reproduce content even when the person has moved away from a first output device during reproduction of the content.

DESCRIPTION OF EMBODIMENTS

First Embodiment

<<Configuration>>

Hereinafter, embodiments will be described in detail with reference to the drawings.

Figure 1:
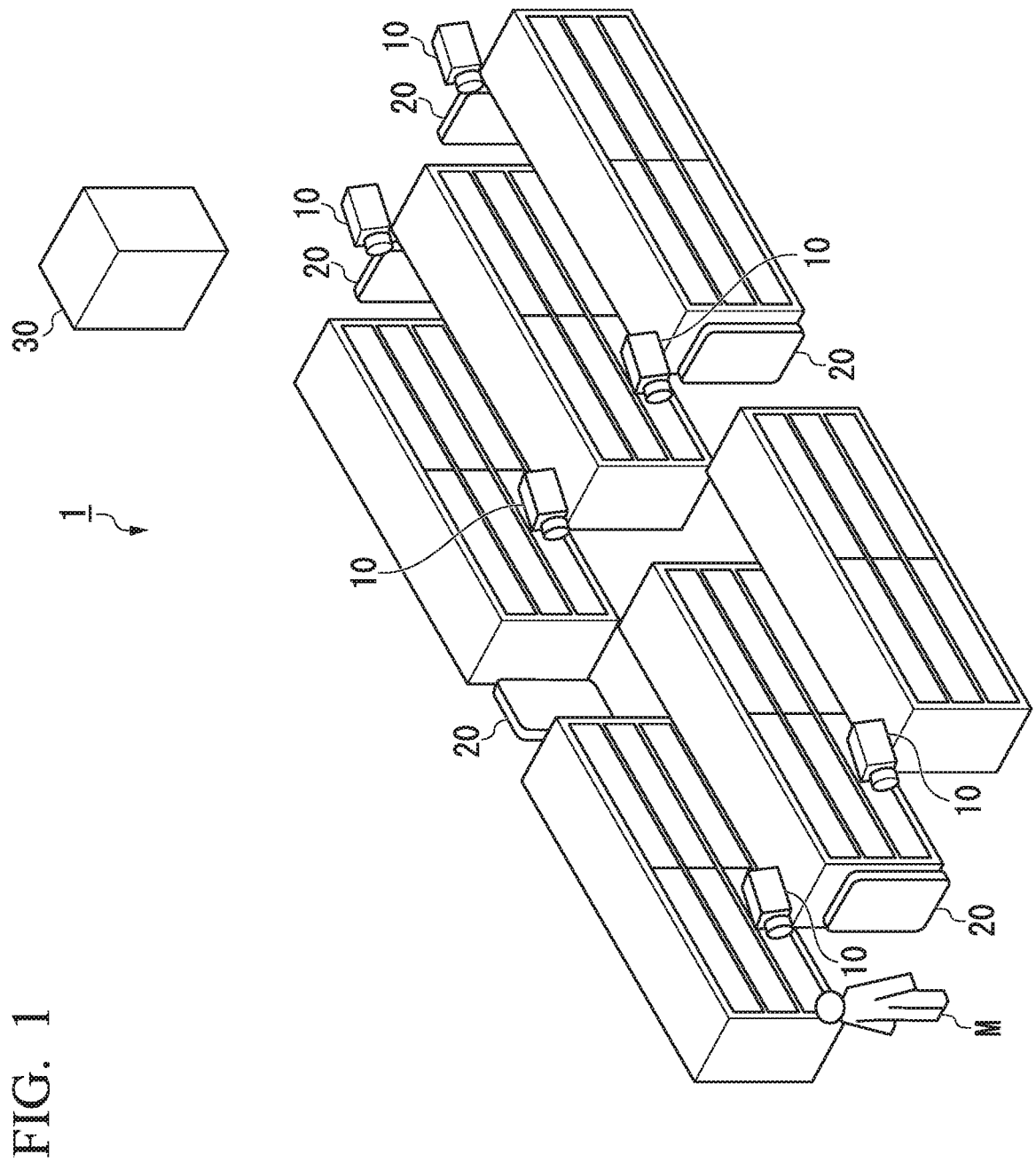
FIG. 1 is a schematic diagram showing a configuration of an information output system according to a first embodiment.

FIG. 1 is a schematic diagram showing a configuration of an information output system according to a first embodiment.

An information output system 1 according to the first embodiment is provided within a shop. The information output system 1 causes advertisement information of details according to a person M to be displayed to a specific person among persons M within the shop. Examples of the specific person include a customer whose purchasing ability is high, a customer for whom an increase in purchasing ability is desired, and a customer registered as a member in the shop.

The information output system 1 includes a plurality of imaging devices 10, a plurality of digital signage devices 20, and an output control device 30.

Each of the plurality of imaging devices 10 is provided within the shop. The imaging device 10 is installed so that all paths to be monitored within the shop are included in an imaging range of any one of the imaging devices 10. An image captured by each imaging device 10 is transmitted to the output control device 30.

The plurality of digital signage devices 20 display images in accordance with instructions from the output control device 30.

The output control device 30 controls the display of each digital signage device 20 on the basis of the image captured by the imaging device 10.

Figure 2:
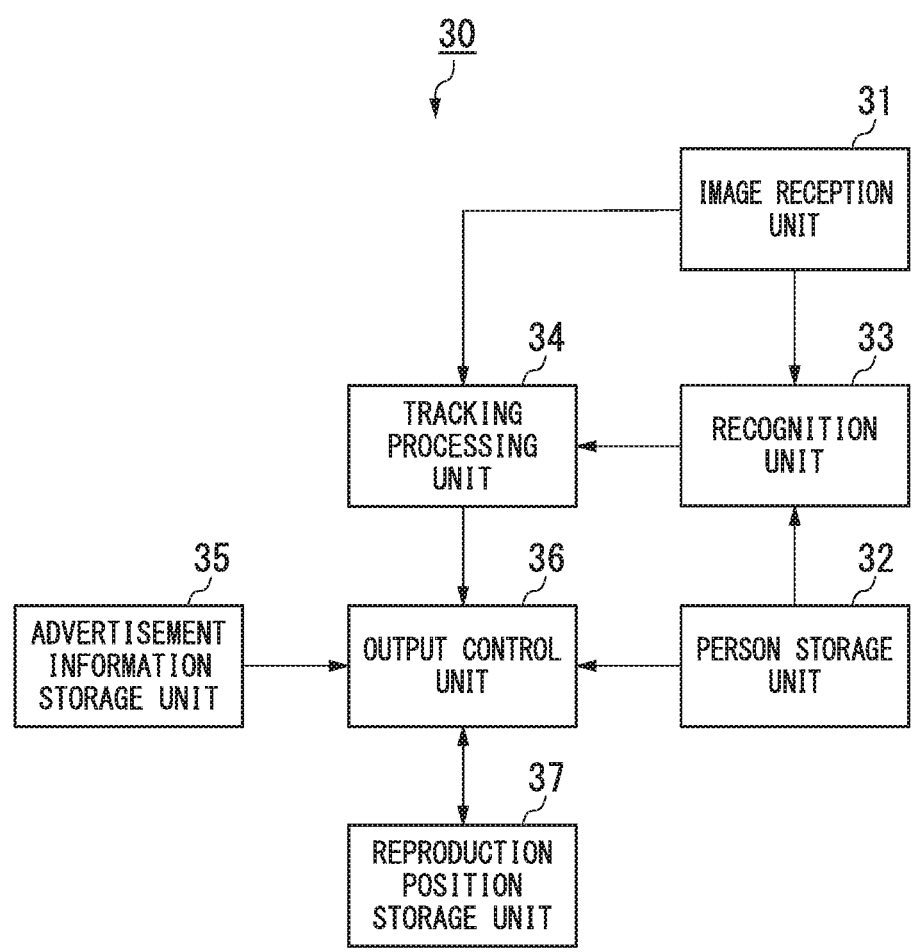
FIG. 2 is a schematic block diagram showing a software configuration of an output control device according to the first embodiment.

FIG. 2 is a schematic block diagram showing a software configuration of the output control device according to the first embodiment.

The output control device 30 includes an image reception unit 31, a person storage unit 32, a recognition unit 33, a tracking processing unit 34, an advertisement information storage unit 35, an output control unit 36, and a reproduction position storage unit 37.

The image reception unit 31 receives an image from each imaging device 10.

With respect to a person M (a specific person) who is a display target of advertisement information, the person storage unit 32 stores a person ID (identification) for identifying the person M, facial feature information of the person M, and preference information of the person M in association each other.

The facial feature information is information for use in face authentication technology. For example, the person ID is given as a serial number. Examples of the facial feature information include a plurality of facial photos and a plurality of feature points extracted from the facial photos. The preference information is information about the person M. Examples of the preference information include products and product categories in which the person M is interested.

Using the image acquired by the image reception unit 31 and the facial feature information stored by the person storage unit 32, the recognition unit 33 recognizes the person M stored by the person storage unit 32 from among persons M shown in the image acquired by the image reception unit 31. The recognition unit 33 is an example of a determination unit configured to determine whether or not a person is a specific person.

Using the image acquired by the image reception unit 31, the tracking processing unit 34 acquires position information of the person M recognized by the recognition unit 33. Specifically, the tracking processing unit 34 identifies a position of the person M within the shop on the basis of a position of the person M in the image acquired by the image reception unit 31 and an installation position of the imaging device 10 capturing the image. The tracking processing unit 34 identifies the same person M on the basis of continuous images captured by the imaging device 10 according to flow line analysis technology. That is, the tracking processing unit 34 can determine whether or not the person M is a person M recognized by the recognition unit 33 even when a face of the person M cannot be recognized in another image by identifying the same person M on the basis of continuous images when the recognition unit 33 has recognized the person M in a certain image. When the recognition unit 33 has recognized the person M, the tracking processing unit 34 starts the acquisition of the position information of the person M (a tracking process). The tracking processing unit 34 is an example of a processing unit configured to acquire position information of a person.

The advertisement information storage unit 35 stores advertisement information and preference information indicated by the advertisement ID, in association with the advertisement ID for identifying the advertisement information. The advertisement information is a moving image. The moving image is an example of information that changes over time.

The output control unit 36 causes the digital signage device 20, which is provided at a position where a distance from a position indicated by the position information acquired by the tracking processing unit 34 is within a predetermined distance among the plurality of digital signage devices 20, to output advertisement information based on the preference information of the person M. The output control unit 36 records the advertisement ID and the reproduction position of the advertisement information in the reproduction position storage unit 37, when the distance between the digital signage device 20, by which the advertisement information has been output, and the person M is greater than or equal to the predetermined distance.

The reproduction position storage unit 37 stores the person ID, the advertisement ID, and the reproduction position of the advertisement information associated therewith each other.

<<Operation>>

The operation of the output control device 30 will be described.

When the output control device 30 is activated, the image reception unit 31 receives an image from each imaging device 10 at regular time intervals (for example, every 5 seconds). When the image reception unit 31 receives an image, the recognition unit 33 determines whether or not a person M stored in the person storage unit 32 is shown in the received image. Specifically, the image reception unit 31 matches the received image with the facial feature information stored by the person storage unit 32 and determines whether or not a degree of similarity between the feature information of the face included in the received image and the facial feature information stored by the person storage unit 32 is greater than or equal to a predetermined threshold value. If the person M stored in the person storage unit 32 is shown in the received image, the tracking processing unit 34 starts the acquisition of the position information of the person M.

Figure 3:
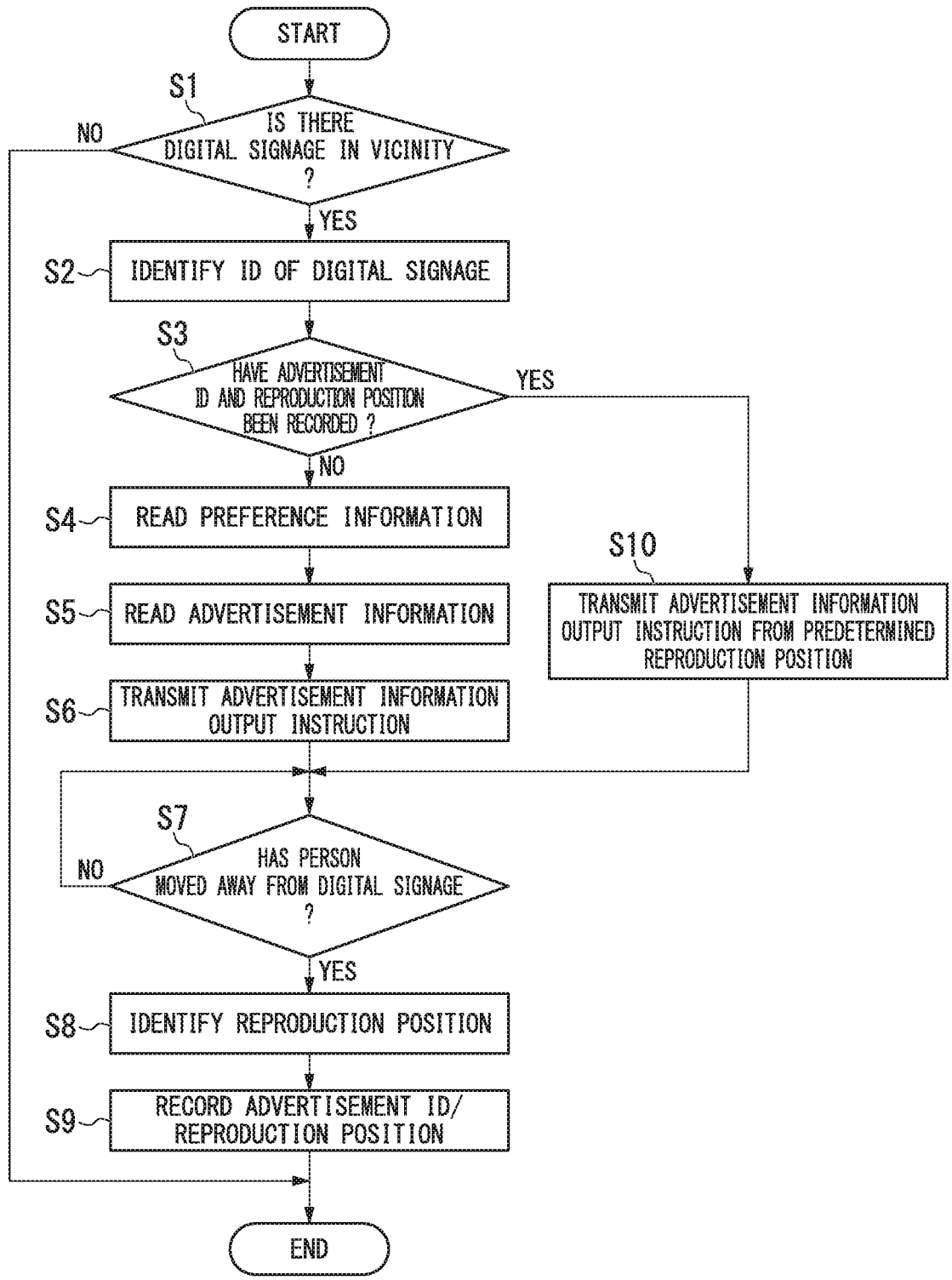
FIG. 3 is a flowchart showing an operation of the output control device according to the first embodiment.

FIG. 3 is a flowchart showing the operation of the output control device according to the first embodiment.

When the tracking processing unit 34 starts the acquisition of position information of the person M, the output control unit 36 determines whether or not the digital signage device 20 is installed in the vicinity of a position indicated by position information acquired by the tracking processing unit 34 (step S1). Specifically, the output control unit 36 determines whether or not the digital signage device 20 is located in a range of a predetermined distance from the position indicated by the position information acquired by the tracking processing unit 34. If the digital signage device 20 is not installed in the vicinity of the position indicated by the position information acquired by the tracking processing unit 34 (step S1: NO), the output control device 30 terminates an output control process and waits for new position information to be acquired by the tracking processing unit 34.

On the other hand, if the digital signage device 20 is installed in the vicinity of the position indicated by the position information acquired by the tracking processing unit 34 (step S1: YES), the output control unit 36 identifies an ID of the digital signage device 20 (step S2). Next, the output control unit 36 determines whether or not an advertisement ID and a reproduction position associated with a person ID of the person M have been recorded in the reproduction position storage unit 37 (step S3). If the advertisement ID and the reproduction position associated with the person ID of the person M have not been recorded in the reproduction position storage unit 37 (step S3: NO), the output control unit 36 reads preference information of the person M recognized by the recognition unit 33 from the person storage unit 32 (step S4). The output control unit 36 reads advertisement information associated with the preference information from the advertisement information storage unit 35 (step S5). The output control unit 36 transmits an instruction for outputting the read advertisement information to the digital signage device 20 identified in step S2 (step S6). Thereby, the digital signage device 20 located in the vicinity of the person M starts the reproduction of the advertisement information according to a preference of the person M. The advertisement information according to the preference of the person M is an example of information for the person.

Next, the output control unit 36 determines whether or not the person M has moved away from the digital signage device 20 on the basis of the position information acquired by the tracking processing unit 34 (step S7). Specifically, the output control unit 36 determines whether or not a distance between the position indicated by the position information acquired by the tracking processing unit 34 and the position where the digital signage device 20 is located is a predetermined distance or more. If the person M has not moved away from the digital signage device 20 (step S7: NO), the output control unit 36 returns to step S7 and iterates the determination of whether or not the person M has moved away from the digital signage device 20.

On the other hand, when the person M has moved away from the digital signage device 20 (step S7: YES), the output control unit 36 identifies a current reproduction position of the advertisement information which is being reproduced in the digital signage device 20 (step S8). For example, the output control unit 36 may identify the current reproduction position of the advertisement information on the basis of an elapsed time from a transmission time of an output instruction for the digital signage device 20. Also, for example, the output control unit 36 may identify the reproduction position by receiving the current reproduction position from the digital signage device 20. The output control unit 36 records the person ID of the person recognized by the recognition unit 33, the advertisement ID of the advertisement information for which the output instruction has been transmitted in step S6, and the identified reproduction position in association with each other in the reproduction position storage unit 37 (step S9). Then, the output control device 30 completes the output control process and waits for new position information to be acquired by the tracking processing unit 34. Thereafter, the corresponding digital signage device 20 may continue to reproduce the current advertisement information or may stop the reproduction of the advertisement information to display advertisement information of initial settings.

If the advertisement ID and the reproduction position have been recorded in the reproduction position storage unit 37 in step S3 (step S3: YES), the output control unit 36 executes the following process. That is, the output control unit 36 transmits an output instruction for causing the advertisement information related to the advertisement ID stored by the reproduction position storage unit 37 to be reproduced from a reproduction position which is a predetermined time (for example, 3 seconds) earlier than a reproduction position stored by the reproduction position storage unit 37 to the digital signage device 20 identified in step S2 (step S10). Thereby, the digital signage device 20 located in the vicinity of the person M can start the reproduction of advertisement information previously reproduced by another digital signage device 20 in the vicinity of the person M in continuation with previous reproduction. Next, the output control unit 36 switches the process to step S7 and determines whether or not the person M has moved away from the digital signage device 20.

<<Operation and Effects>>

As described above, according to the first embodiment, if a person shown in an image captured by the imaging device 10 is a specific person, the output control device 30 starts the acquisition of position information of the person and causes the digital signage device 20 located in the vicinity of the person to output information for the person on the basis of the position information. Thereby, the output control device 30 can present information to a specific customer by using the digital signage device 20.

Also, according to the first embodiment, if the reproduction position storage unit 37 stores the advertisement ID in association with the person ID, the output control device 30 causes the digital signage device 20 in the vicinity of the person to output the advertisement information related to the advertisement ID. In other words, if the person has moved to the vicinity of the digital signage device 20 (a second output device) different from the digital signage device 20 (a first output device) that has already output information, the output control device 30 outputs information for the person to the digital signage device 20 of a movement destination.

Thereby, it is possible to continue to present information to a specific person at a movement destination every time the specific person moves.

Also, according to the first embodiment, the advertisement information is a moving image, and the output control device 30 causes the second digital signage device 20 to output the advertisement information displayed on the first digital signage device 20. At this time, the output control device 30 causes the advertisement information to be output from a reproduction position according to a reproduction position from a point in time at which the person M moved away from the first digital signage device 20.

Thereby, it is possible to enable a specific person moving within a facility to appropriately view advertisement information that changes over time.

Figure 4:
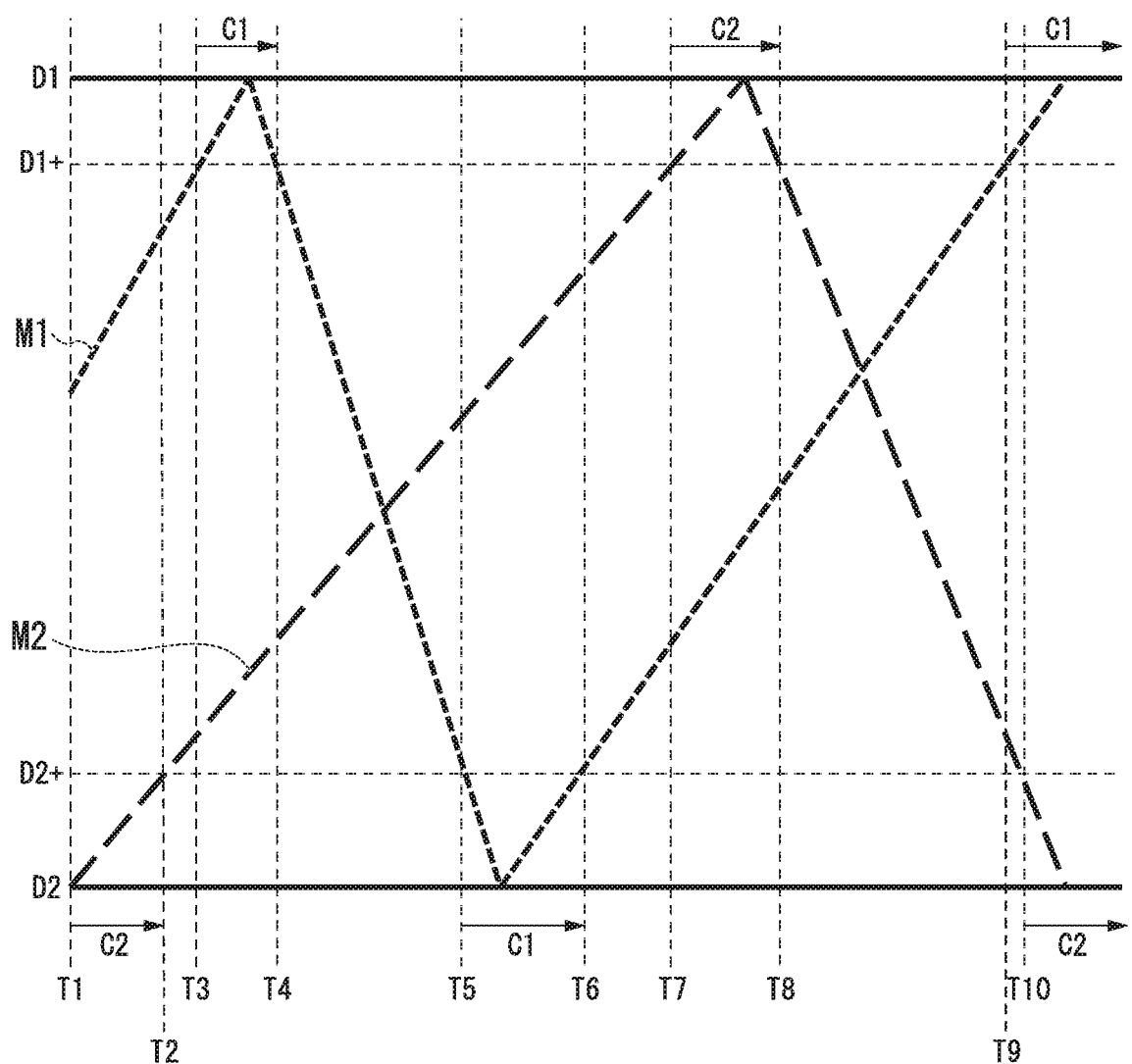
FIG. 4 is a diagram showing an operation example of the information output system according to the first embodiment.

FIG. 4 is a diagram showing an operation example of the information output system according to the first embodiment.

The example shown in FIG. 4 is an example in which a person M and a person M2 who are specific persons move within a facility.

Within the facility, a digital signage device 20-1 and a digital signage device 20-2 are provided.

The vertical axis of FIG. 4 represents a position within the facility and the horizontal axis thereof represents time. A line D1 indicates a position where the digital signage device 20-1 is installed. A line D1+ indicates a threshold value for determining that the person M is located at a position of a predetermined distance from the digital signage device 20-1, i.e., in the vicinity of the digital signage device 20-1. A line D2 indicates a position where the digital signage device 20-2 is installed. A line D2+ indicates a threshold value for determining that the person M is located at a position of a predetermined distance from the digital signage device 20-2, i.e., in the vicinity of the digital signage device 20-2. A line (broken line) M indicates the transition of the position of the person M1. A line (long broken line) M2 indicates the transition of the position of the person M2.

The person M2 is located in the vicinity of the digital signage device 20-2 at time T1 and moves away from the digital signage device 20-2 at time T2. The person M2 is located in the vicinity of the digital signage device 20-1 at time T7 and moves away from the digital signage device 20-1 at time T8. The person M2 is located in the vicinity of the digital signage device 20-2 at time T10.

The person M1 is located in the vicinity of the digital signage device 20-1 at time T3 and moves away from the digital signage device 20-1 at time T4. The person M1 is located in the vicinity of the digital signage device 20-2 at time T5 and moves away from the digital signage device 20-2 at time T6. The person M1 is located in the vicinity of the digital signage device 20-1 at time T9.

In such a situation, the output control device 30 operates as follows.

At time T1, the output control device 30 causes the digital signage device 20-2 to start the output of advertisement information C2 based on preference information of the person M2. At time T2, the output control device 30 identifies a reproduction position (T2−T1) of the advertisement information C2 in the digital signage device 20-2. At time T3, the output control device 30 causes the digital signage device 20-1 to start the output of advertisement information C1 based on preference information of the person M1. At time T4, the output control device 30 identifies a reproduction position (T4−T3) of the advertisement information C1 in the digital signage device 20-1. At time T5, the output control device 30 causes the digital signage device 20-2 to start the output of the advertisement information C1 from the reproduction position (T4−T3). At time T6, the output control device 30 identifies a reproduction position (T4−T3+T6−T5) of the advertisement information C1 in the digital signage device 20-2. At time T7, the output control device 30 causes the digital signage device 20-1 to start the output of the advertisement information C2 from the reproduction position (T2−T1). At time T8, the output control device 30 identifies a reproduction position (T2−T1+T8−T7) of the advertisement information C2 in the digital signage device 20-1. At time T9, the output control device 30 causes the digital signage device 20-1 to start the output of the advertisement information C1 from the reproduction position (T4−T3+T6−T5). At time T10, the output control device 30 causes the digital signage device 20-2 to start the output of the advertisement information C2 from the reproduction position (T2−T+T8−T7).

As described above, according to the first embodiment, the output control device 30 can appropriately provide information to each specific person even when there are a plurality of specific persons.

Although the embodiment has been described above in detail with reference to the drawings, specific configurations are not limited to those described above and various design changes and the like can be made.

For example, although the information output system 1 includes the digital signage device 20 serving as an output device in the above-described embodiment, the present invention is not limited thereto. For example, in other embodiments, other output devices configured to output information to a person located at a predetermined location such as a parametric speaker may be provided. If the information output system 1 includes a parametric speaker, speech data can be used as the advertisement information.

Also, although a case in which the advertisement information is a moving image has been described in the above-described embodiment, the present invention is not limited thereto. For example, the advertisement information according to another embodiment may be other information that changes over time such as content including a plurality of still images in which display details are changed in accordance with time.

Also, although the case in which the information output system 1 is provided within a shop has been described in the above-described embodiment, the present invention is not limited thereto. For example, in another embodiment, the information output system 1 may be provided in another facility such as a hospital or outdoors. If the information output system 1 is provided in the hospital, the information output system 1 may cause guidance information for a patient to be displayed in place of the advertisement information. The guidance information is information for the patient.

Also, although information that changes over time is appropriately displayed on the digital signage device 20 located in the vicinity of the person M every time the person M moves in the above-described embodiment, the present invention is not limited thereto. For example, in another embodiment, a product or the like in which the person M is interested may be identified on the basis of position information acquired by the tracking processing unit 34 and advertisement information of the product or advertisement information of other products related to the product may be displayed by the digital signage device 20 at a movement destination. Also, for example, in another embodiment, still images of content including a plurality of still images may be displayed by the digital signage device 20 at a movement destination one by one every time a person moves.

Also, although the recognition unit 33 determines whether or not the person M is a specific person on the basis of an image captured by the imaging device 10 in the above-described embodiment, the present invention is not limited thereto. For example, in another embodiment, the person M may be recognized by acquiring information from an object possessed by the person M (for example, an integrated circuit (IC) card or the like).

Also, although the tracking processing unit 34 performs flow line analysis on the basis of an image captured by the imaging device 10 in the above-described embodiment, the present invention is not limited thereto. For example, in another embodiment, the tracking processing unit 34 may extract footprints by sensors laid on the floor surface to perform flow line analysis.

Also, although the recognition unit 33 detects that the person M has moved away from the digital signage device 20 in the above-described embodiment, the present invention is not limited thereto. For example, the recognition unit 33 may not detect that the person M has moved away from the digital signage device 20 in another embodiment. In this case, the digital signage device 20 (the first output device) continues the reproduction of the advertisement information regardless of whether or not the person has moved away. On the other hand, the output control device 30 causes the digital signage device 20 (the second output device) that the person has subsequently approached, to reproduce advertisement information, from a reproduction position of the advertisement information during reproduction in the digital signage device 20 (the first output device) from which the person previously moved away (or a reproduction position before a predetermined time).

<<Basic Configuration>>

Figure 5:
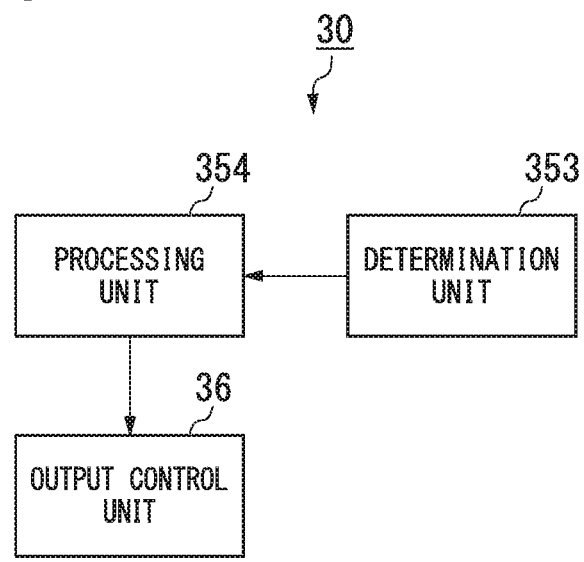
FIG. 5 is a schematic block diagram showing a basic configuration of the output control device.

FIG. 5 is a schematic block diagram showing the basic configuration of the output control device.

Although the configuration shown in FIG. 2 has been described as an embodiment of the output control device 30 in the above-described embodiment, the basic configuration of the output control device 30 is as shown in FIG. 5.

That is, the output control device 30 has a basic configuration of a determination unit 353, a processing unit 354, and an output control unit 36.

The determination unit 353 determines whether or not the person M is a specific person.

The processing unit 354 acquires position information of the person M.

The output control unit 36 causes a first output device located in the vicinity of the person M to output information according to the person M on the basis of personal information about the person M determined to be the specific person by the determination unit 353 and the position information acquired by the processing unit 354. The output control unit 36 causes a second output device to output the information output by the first output device in continuation with the output of the first output device, when the person M has moved from the vicinity of the first output device to the vicinity of the second output device.

Figure 6:
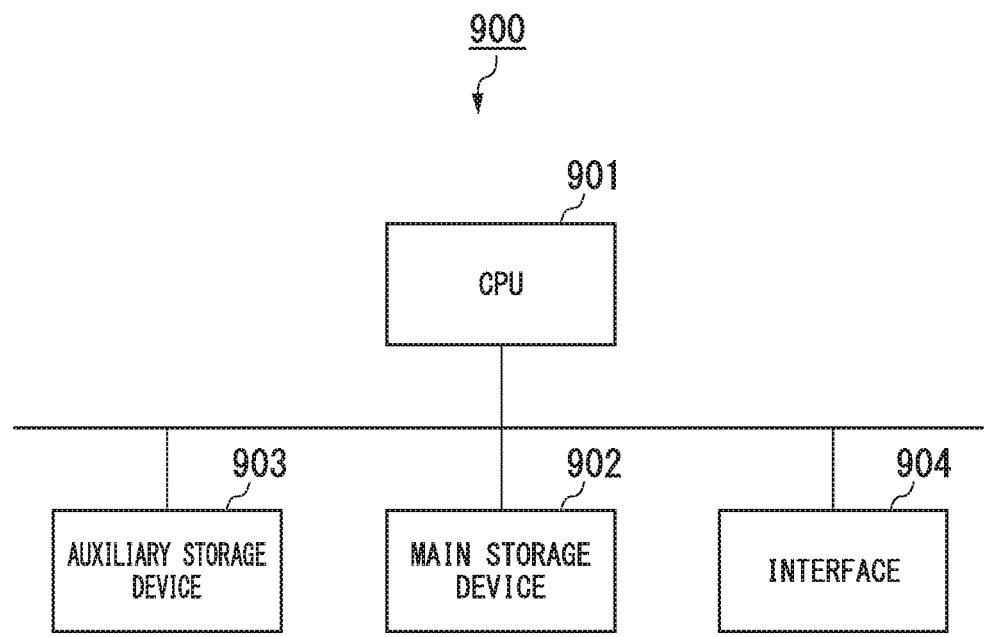
FIG. 6 is a schematic block diagram showing a configuration of a computer according to at least one embodiment.

FIG. 6 is a schematic block diagram showing the configuration of a computer according to at least one embodiment.

A computer 900 includes a central processing unit (CPU) 901, a main storage device 902, an auxiliary storage device 903, and an interface 904.

The above-described output control device 30 is mounted in the computer 900. The operations of the above-described processing units are stored in the auxiliary storage device 903 in the form of a program. The CPU 901 reads the program from the auxiliary storage device 903, loads the program to the main storage device 902, and executes the above-described process according to the program. Also, the CPU 901 secures a storage area corresponding to each of the above-described storage units in the main storage device 902 in accordance with the program.

Also, in at least one embodiment, the auxiliary storage device 903 is an example of a non-transitory tangible medium. Other examples of the non-transitory tangible medium include a magnetic disk, a magneto-optical disc, a compact disc read only memory (CD-ROM), a digital versatile disc read only memory (DVD-ROM), a semiconductor memory, and the like connected via the interface 904. Also, if this program is distributed to the computer 900 via a communication line, the computer 900 receiving the distributed program may load the program to the main storage device 902 and execute the above-described process.

Also, the above-described program may be a program for implementing some of the above-described functions.

Further, the above-described program may be a program capable of implementing the above-described functions in combination with another program already recorded in the auxiliary storage device 903, i.e., a so-called differential file (differential program).

This application claims priority based on Japanese Patent Application No. 2016-059185, filed Mar. 23, 2016, the disclosure of which is incorporated herein.

INDUSTRIAL APPLICABILITY

According to the present invention, it is possible to cause a second output device, which is another output device located in the vicinity of a person, to continuously reproduce content even when the person has moved away from a first output device during reproduction of the content.

REFERENCE SIGNS LIST

1 Information output system
10 Imaging device
20 Digital signage device
30 Output control device
31 Image reception unit
32 Person storage unit
33 Recognition unit
34 Tracking processing unit
35 Advertisement information storage unit
36 Output control unit
37 Reproduction position storage unit

The invention claimed is:
1. An output control device, comprising:
at least one memory configured to store instructions; and
at least one hardware processor configured to execute the instructions to:
acquire position information of a specific person;
determine a presence of a first display, from a plurality of displays, based on the position information of the specific person;
determine personal information which the specific person is interested;
cause the first display to output information according to the specific person based on the determined personal information;

acquire a second reproduction position being played on the first display at the time the specific person moved away from the first display; and cause a second display that is different from the first display to output the information output by the first display from a first reproduction position of a point in time which is a predetermined time earlier than the second reproduction position, in a case where the specific person has moved to the second display.

2. The output control device according to claim 1, wherein the information changes over time.

3. The output control device according to claim 1, wherein the at least one hardware processor is further configured to cause the second display to output the information output by the first display from the first reproduction position according to the second reproduction position at a point in time when the specific person moved away from the first display.

4. The output control device according to claim 1, wherein the at least one hardware processor is further configured to:

determine as the personal information, based on the position information, a product to which the specific person is interested;

determine the information according to the specific person and the product; and cause the first display to output the information.

5. The output control device according to claim 1, wherein the at least one hardware processor is further configured to execute the instructions to determine the presence of the first display by determining whether the first display is installed within a range of a position indicated by the position information of the specific person.

6. The output control device according to claim 1, wherein the at least one hardware processor is further configured to execute the instructions to:

determine whether or not reproduction information associated with the specific person is stored in the at least one memory, the reproduction information including information to be output and reproduction position of the information, determine the personal information which the specific person is interested when the reproduction information associated with the specific person is not stored in the at least one memory, and cause the first display to output the information corresponding to the specific person based on the determined personal information, and cause to first display to output the information, which is output to another display among a plurality of displays, in continuation with output of the another display based on the reproduction information, when the reproduction information associated with the specific person is stored in the at least one memory.

7. An information output system, comprising:
a plurality of displays; and
an output control device configured to control information to be output to the plurality of displays, wherein the output control device includes
at least one memory configured to store instructions; and
at least one hardware processor configured to execute the instructions to:

acquire position information of a specific person;

determine a presence of a first display, from the plurality of displays, based on the position information of the specific person;

determine personal information which the specific person is interested;

cause the first display to output information according to the specific person based on the determined personal information;

acquire a second reproduction position being played on the first display at the time the specific person moved away from the first display; and cause a second display that is different from the first display to output the information output by the first display from a first reproduction position of a point in time which is a predetermined time earlier than the second reproduction position, in a case where the specific person has moved to the second display.

8. An output control method, comprising:

acquiring position information of a specific person;

determining a presence of a first display, from a plurality of displays, based on the position information of the specific person;

determining personal information which the specific person is interested;

causing the first display to output information according to the specific person based on the determined personal information;

acquiring a second reproduction position being played on the first display at the time the specific person moved away from the first display; and causing a second display that is different from the first display to output the information output by the first display from a first reproduction position of a point in time which is a predetermined time earlier than the second reproduction position, in a case where the specific person has moved to the second display.

9. A non-transitory computer-readable recording medium storing a program that causes a computer to execute processes, the processes comprising:

acquiring position information of a specific person;

determine a presence of a first display, from a plurality of displays, based on the position information of the specific person;

determine personal information which the specific person is interested;

causing a first display located in the vicinity of the specific person to output information according to the specific person based on the determined personal information;

acquiring a second reproduction position being played on the first display at the time the specific person moved away from the first display; and causing a second display that is different from the first display to output the information output by the first display from a first reproduction position of a point in time which is a predetermined time earlier than the second reproduction position, in a case where the specific person has moved to the second display.

* * * * *